(12) United States Patent
Burke et al.

(10) Patent No.: US 7,645,482 B2
(45) Date of Patent: Jan. 12, 2010

(54) METHOD TO MAKE AND USE LONG SINGLE-WALLED CARBON NANOTUBES AS ELECTRICAL CONDUCTORS

(75) Inventors: Peter J. Burke, Irvine, CA (US); Zhen Yu, Irvine, CA (US); Shengdong Li, Irvine, CA (US)

(73) Assignee: The Regents of the University of California, Oakland, CA (US)

(*) Notice: Subject to any disclaimer, the term of this patent is extended or adjusted under 35 U.S.C. 154(b) by 623 days.

(21) Appl. No.: 11/224,917

(22) Filed: Sep. 12, 2005

(65) Prior Publication Data
US 2008/0020130 A1      Jan. 24, 2008

Related U.S. Application Data

(63) Continuation-in-part of application No. 11/198,902, filed on Aug. 4, 2005.

(51) Int. Cl.
*C23C 16/00* (2006.01)
(52) U.S. Cl. ............... 427/248.1; 427/249.1; 427/903
(58) Field of Classification Search ............... None
See application file for complete search history.

(56) References Cited

U.S. PATENT DOCUMENTS

| | | | |
|---|---|---|---|
| 5,134,963 A * | 8/1992 | Barbee et al. ............ 118/715 |
| 6,346,189 B1 | 2/2002 | Dai et al. | |
| 6,764,874 B1 | 7/2004 | Zhang et al. | |
| 6,863,942 B2 * | 3/2005 | Ren et al. ............... 428/36.9 |
| 6,875,412 B2 | 4/2005 | Margrave et al. | |
| 6,905,667 B1 | 6/2005 | Chen et al. | |
| 7,226,818 B2 * | 6/2007 | Malenfant et al. ......... 438/149 |
| 7,361,594 B2 * | 4/2008 | Kawase et al. ............ 438/678 |
| 2002/0090330 A1 | 7/2002 | Smalley et al. | |
| 2002/0090331 A1 | 7/2002 | Smalley et al. | |
| 2005/0112051 A1 | 5/2005 | Liu et al. | |
| 2005/0123467 A1 * | 6/2005 | Harutyunyan ........... 423/447.1 |
| 2005/0161750 A1 | 7/2005 | Dai et al. | |

FOREIGN PATENT DOCUMENTS

WO      WO 01/44796 A1 *   6/2001

OTHER PUBLICATIONS

Bradley et al. Flexible Nanotube Electronics, 2003, Nano Letters, 3(10), pp. 1353-1355.*
Martel et al. Single- and multi-wall carbon nanotube field-effect transistors, Oct. 1998, App Phys Lett, 73(17), pp. 2447-2449.*

(Continued)

*Primary Examiner*—Timothy Meeks
*Assistant Examiner*—Kelly M Gambetta
(74) *Attorney, Agent, or Firm*—Orrick, Herrington & Sutcliffe LLP

(57) ABSTRACT

Systems and methods for synthesizing long carbon nanotubes and using the nanotube as an electrical conductor. A substrate is provided with one or more metal underlayer platforms that allow the nanotube to grow freely suspended from the substrate. A modified gas-flow injector is used to reduce the gas flow turbulence during nanotube growth. Nanotube electrodes are formed by growing arrays of aligned nanotubes between two metal underlayer platforms.

22 Claims, 8 Drawing Sheets

OTHER PUBLICATIONS

Dai, Hongjie, Carbon Nanotubes: Synthesis, Integration and Properties, 2002, Acc Chem Res, 35, pp. 1035-1044.*

Li et al., Cabon Nanotube Transisor Operation at 2.6 GHz, Mar. 23, 2004, Nano Lett. 4(4) pp. 753-756.*

Li et al. Carbon Nanotube Growth for GHz Devices, Proceedings of the 3rd IEEE Conference on Nanotechnology, 2003.*

Huang et al. Long and Oriented Single-Walled Carbon Nanotubes Grown by Ethanol Chemical Vapor Deposition, J. Phys. Chem. B, 2004, 108, pp. 16541-165456.*

Franklin et al., "Integration of suspended carbon nanotube arrays into electronic devices and electromechanical systems", Applied Physics Letters, vol. 81, No. 5, pp. 913-915 (Jul. 29, 2002).

Huang, et al., "Long and Oriented Single-Walled Carbon Nanotubes Grown by Ethanol Chemical Vapor Deposition", J. Phys. Chem. B, vol. 108, pp. 16451-16456 (Sep. 29, 2004).

Yu et al., "Synthesis of Aligned Arrays of Millimeter Long, Straight Single-Walled Carbon Nanotubes", Chem. Mater., vol. 16, pp. 3414-3416 (and three (3) pages of supplemental information) (Aug. 5, 2004).

Huang, et al., "Growth of Millimeter-Long and Horizontally Aligned Single-Walled Carbon Nanotubes on Flat Substrates", J. Am. Chem. Soc., vol. 125, No. 19, pp. 5636-5637 (Apr. 22, 2003).

Li et al., "Electrical Properties of 0.4 cm Long Single-Walled Carbon Nanotubes", Nano Lett., vol. 4, No. 10, pp. 2003-2007 (Sep. 11, 2004).

* cited by examiner

METHOD TO MAKE AND USE LONG SINGLE-WALLED CARBON NANOTUBES AS ELECTRICAL CONDUCTORS

CROSS-REFERENCE TO RELATED APPLICATION

The subject application is a continuation-in-part of U.S. application Ser. No. 11/198,902 filed Aug. 4, 2005, which application is incorporated by reference.

This invention was made with Government support under Contract No. N66001-03-1-8914 awarded by DARPA. The Government has certain rights in this invention.

FIELD OF THE INVENTION

The disclosure relates generally to single-walled carbon nanotubes, and more particularly to systems and methods for the fabrication of long single-walled carbon nanotubes as electrical conductors.

BACKGROUND OF THE INVENTION

Carbon nanotubes are wires of pure carbon with nanoscale dimensions. The diameter of a single-walled carbon nanotube (SWNT) is typically in the range of approximately 1-5 nm. SWNTs generally consist of a single atomic layer thick sheet of graphite configured into a cylinder. Multi-walled carbon nanotubes (MWNT) generally consist of a plurality of concentric nanotube shells and have a diameter generally on the order of about 50 nm. Nanotubes have potential applications in a wide variety of formats including electronics, materials, biotechnology and the like.

There are currently three general methods for the synthesis of SWNTs: arc discharge, laser ablation, and chemical vapor deposition (CVD) system. In the arc discharge method, an electric arc discharge is created between two carbon electrodes either with or without a catalyst present. Nanotubes are self-assembled from the resulting carbon vapor. The method is a fast method which produces a large amount of impure nanotube material. In laser ablation, a high power laser beam is directed onto a graphite target. Typically, the graphite target is a volume of carbon-containing feedstock gas such as methane or carbon monoxide. Laser ablation generally produces a small amount of clean nanotubes.

In chemical vapor deposition, a substrate, such as silicon, is prepared by sputtering or otherwise patterning a metal layer onto the substrate. Chemical etching or thermal annealing is then used to create wells in the substrate that are used to induce catalyst particle nucleation. Next, during the nanotube synthesis phase, an energy source transfers energy to a gaseous carbon molecule to put the molecule into the gas phase. Methane, carbon monoxide, ethylene, or acetylene is generally used as the carbon source. The transfer energy acts to split the carbon source molecule into a reactive atomic carbon. Nanotubes are formed as the atomic carbon diffuses towards the substrate and binds with the metal catalyst. CVD is the considered the easiest of the three methods to scale up for commercial applications. In addition, as compared to the other two methods, CVD has the advantage that the nanotube catalyst structures used to initiate growth can be defined lithographically.

Some current methods for creating long SWNTs in a CVD reaction chamber require the use of two or more furnaces. Other methods exist for the synthesis of arrays of long SWNTs such as that disclosed by Liu et al. in United States Patent Application Publication No. 2005/0112051. The Liu group has described the synthesis of long SWNTs using a technique based on "fast heating." The Liu process generally involves heating the nanotube catalyst and substrate to a temperature of between 850 and 1050° C. for 10 to 20 minutes. Since the process includes a cumbersome heating step, the process is less efficient than a method of synthesis that does not require fast heating. In addition, the Liu group method requires a post processing step in order to add electrical contacts.

Therefore, the need exists for an efficient system and method for the creation of ultra-long arrays of nanotubes and nanotube electrodes.

SUMMARY OF THE INVENTION

Described below are exemplary systems and methods of synthesizing carbon nanotubes using a metal underlayer platform deposited onto a substrate and using the carbon nanotubes as electrical conductors. These systems and methods are examples only and are not intended to limit the invention.

Arrays of long, straight nanotubes can be grown via the methods described herein using a single furnace system, without the need for rapid heating. In a preferred embodiment, the single furnace system comprises a modified CVD reaction chamber which reduces the turbulence of the gas flow of the hydrocarbon source provided during the growth phase. The reduced turbulence creates an enhanced environment for ultra-long nanotube formation. In addition, a raised platform, comprising an underlayer of metal, is deposited onto a substrate. The raised platform allows the nanotube to grow freely suspended from the substrate in the low turbulence gas flow. This reduces any steric force impedance caused by the substrate and enables the nanotube to be grown to lengths on the order of centimeters.

In addition, in a preferred embodiment, the metal underlayer is comprised of a conductive metal such as gold. Using the methods described herein, the nanotube is able to grow from one metal underlayer platform to another such platform. The nanotube is thereby connected at both ends to a conductive material and forms a nanotube electrode without the need for a post nanotube formation processing step. The metal underlayer tends to melt during the CVD growth process and flows over the nanotube just after growth during the CVD run.

Other systems, methods, features, and advantages of the invention will be or will become apparent to one with skill in the art upon examination of the following figures and detailed description. It is intended that all such additional systems, methods, features and advantages be included within this description, be within the scope of this invention, and be protected by the accompanying claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE DRAWINGS

The details of the invention may be gleaned in part by study of the accompanying figures, in which like reference numerals refer to like components.

Figure 1:
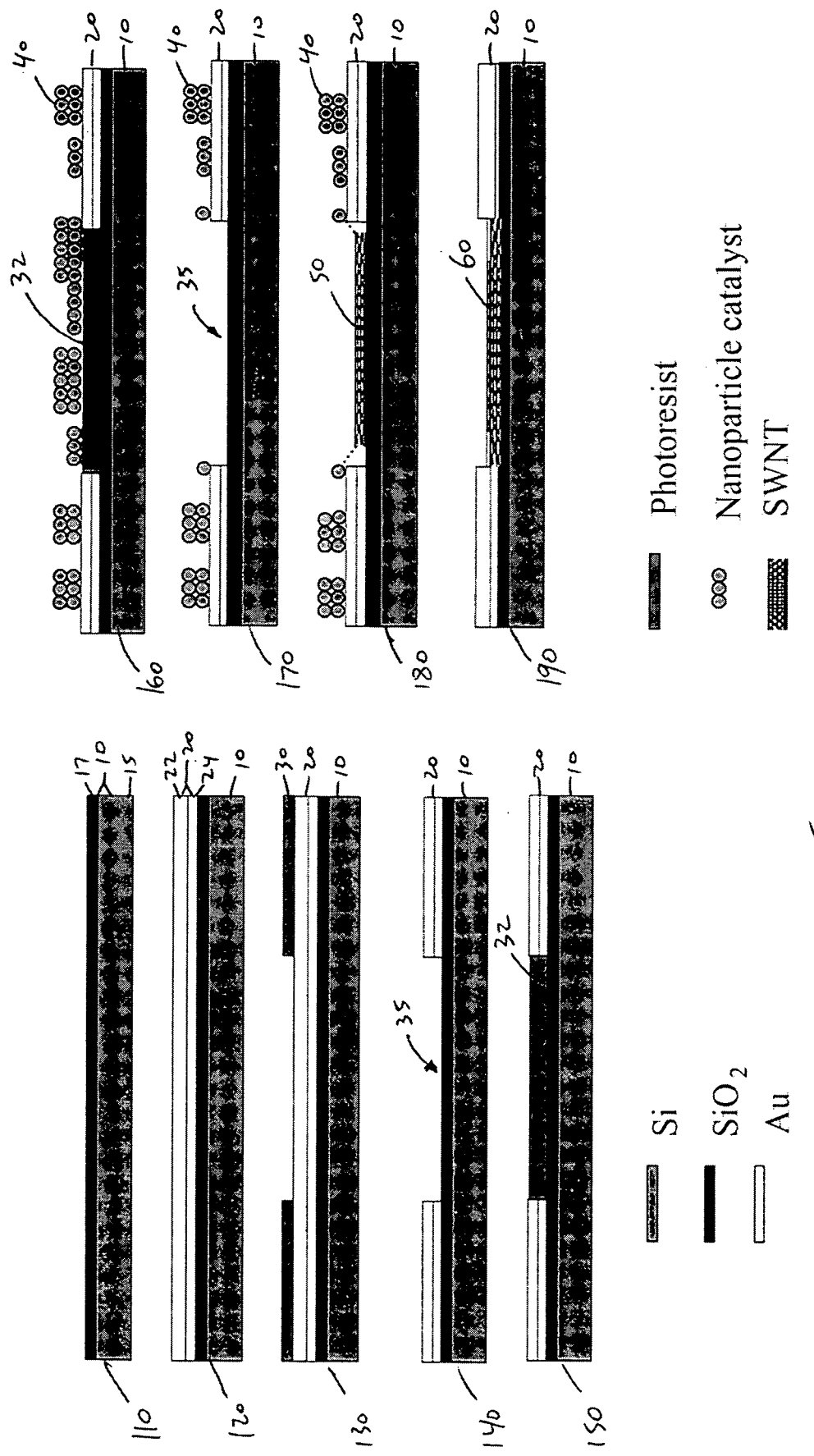
FIG. 1 is a flow diagram showing an exemplary method for synthesizing a carbon nanotube using the synthesis methods disclosed herein.

It should be noted that the figures are not drawn to scale and that elements of similar structures or functions are generally represented by like reference numerals for illustrative purposes throughout the figures. It also should be noted that the figures are only intended to facilitate the description of the preferred embodiments.

DETAILED DESCRIPTION OF THE PREFERRED EMBODIMENTS

FIG. 1 depicts an exemplary method of synthesizing single-walled carbon nanotubes. The methods disclosed herein can also be modified to form multi-walled carbon nanotubes. In step 110, a substrate 10 is prepared according to cleanroom standards. The substrate 10 can comprise a lower, primary layer 15 and an upper, insulating layer 17. The primary layer 15 of the substrate 10 preferably includes silicon (Si). The insulating layer 17 can comprise a material such as silicon dioxide ($SiO_2$), silicon nitride ($Si_3N_4$), or the like. In one exemplary embodiment, the substrate is a four inch silicon wafer with a 500 nm thick silicon dioxide ($SiO_2$) film. The silicon wafer can be of any form known in the art. In one exemplary embodiment, the silicon wafer is a 100, p-type with a resistivity of about 12-16 kΩ-cm. The substrate 10 can also be comprised of other suitable materials such as a glass, a ceramic, a sapphire, a metal, a semiconductor material, or other materials known in the art.

A thin metal underlayer 20 is then deposited onto the insulating layer (step 120). The metal underlayer 20 can be deposited and patterned by electron beam evaporation or thermal evaporation. Alternatively, the metal underlayer 20 can be deposited by inductive heating evaporation, sputter deposition, or other method known in the art. Preferably, the metal underlayer 20 is patterned photolithographically using lift-off. A variety of metals can be used to form the metal underlayer 20 such as nickel, aluminum, iridium, chromium, gold, a transition metal, and the like. In a preferred embodiment, the metal underlayer 20 comprises gold (Au) 22. In one exemplary embodiment, the metal underlayer 20 is a chromium 24-gold 22 bilayer having a thickness of about 100 nm to 300 nm. As discussed further below, the metal underlayer 20 creates a platform for nanotube growth. The metal underlayer 20 platform prevents steric forces created by the substrate 10 from inhibiting the growth of the nanotubes 50. Therefore, the metal underlayer 20 facilitates production of ultralong carbon nanotubes.

Next, photoresist 30 is applied to the substrate 10 (step 130). Photoresist 30 can be applied by any method known in the art such as spin coating. The photoresist 30 is then patterned and developed. Preferably, the photoresist 30 is patterned by optical lithography. In other embodiments, the photoresist 30 can be patterned by e-beam lithography or other methods known in the art. The application of the photoresist 30 is used to create wells or trenches 35 in the photoresist 30 over the metal underlayer pattern after a standard lift-off process (step 140). In a preferred embodiment, the photoresist 30 is a positive photoresist 30. The photoresist 30 can comprise a mixture of Diazonaphthoquinone (DNQ) and Novolac resin, or be any other type of positive photoresist known in the art. In an alternative embodiment, a dielectric material can be used instead of photoresist 30. The dielectric material is deposited, patterned and etched to create one or more trenches 35. Alternatively, a metal etchant can be used to etch out the unpatterned metal underlayer to produce one or more trenches. In a further embodiment, a second layer of photoresist 32 can be applied if desired at step 150. The second photoresist layer 32 is preferably aligned and patterned as described further above.

Next, a nanoparticle catalyst 40 is applied at step 160. The nanoparticle catalyst 40 is applied by spin coating. Alternatively, the nanoparticle catalyst 40 can be applied by optical lithography or other method known in the art. The nanoparticle catalyst 40 can comprise any metal catalyst known in the art such as cobalt (Co), nickel (Ni), yttrium (Y), iron (Fe), molybdenum (Mo), or be an alloy of more than one metal catalyst. The metal catalyst chosen will effect the diameter, morphology, thickness, structure, and growth rate of the resulting nanotube 50. Preferably, the nanoparticle catalyst 40 comprises an aqueous solution of Fe-laden alumina nanoparticle catalysts.

In one exemplary embodiment, the nanoparticle suspension was prepared by adding 0.3 grams of alumina nanoparticles, 1.0 mmol of $Fe(NO_3)_3 \cdot 9H_2O$, and 0.3 mmol of $MoO_2(acac)_2$ to 300 mL of DI water (18 MΩ-cm). Prior to being deposited on the substrate 10, the nanoparticle catalyst solution is stirred for twenty-four hours and sonicated for one hour. Use of water as the solvent to dissolve the transition metal catalyst provides an advantage over current techniques. Most current systems use a polar solvent such as methanol ($CH_3OH$) to dissolve the nanoparticle catalysts. These systems therefore require polymethylmethacrylate (PMMA) to be used as the patterning material to prevent it from dissolving under the polar solvent of the catalyst solution. This procedure requires the use of expensive lithography. In contrast, use of water as the solvent allows for patterning using standard optical lithography thereby creating a more cost-efficient means of synthesizing nanotubes 50.

The nanoparticle catalyst 40 is then allowed to dry in air and is lifted off in acetone. The lift-off process also removes the photoresist 32. This process results in a lithographically defined catalyst pattern which is ready for growth (step 170). For example, in an embodiment using a chromium-gold metal underlayer 20, the lift-off process creates a Cr/Au/nanoparticle catalyst that is ready for nanotube 50 synthesis and growth.

Figure 2:
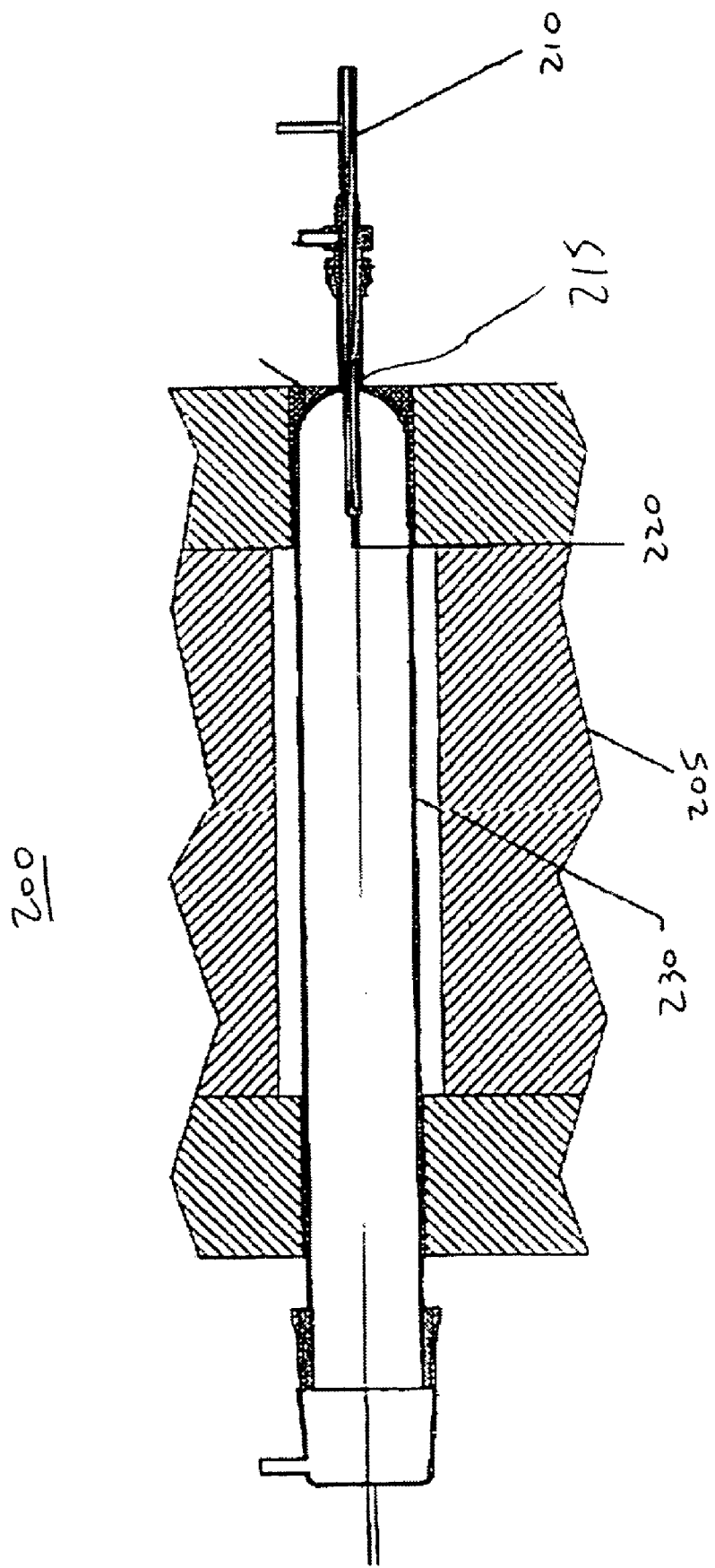
FIG. 2 is a schematic of an exemplary embodiment of a modified CVD reaction chamber.

In a preferred embodiment, nanotube 50 growth then takes place in a CVD reaction chamber 200 at step 180 (FIG. 2). Preferably the synthesis is conducted using a single furnace 205, however multiple furnace systems are also contemplated by this disclosure. The furnace 205 can be of any form known in the art. In a preferred embodiment, a Lindberg furnace is used. The CVD chamber 200 preferably includes a modified gas-flow injector 210 to minimize turbulent gas flow. The injector 210 preferably includes a smaller diameter tube 220 inserted into the larger diameter growth tube 230 through an airtight fitting 215. Instead of injecting gas directly in from the end of the larger diameter growth tube 230, the gas flows through the smaller diameter tube 220 and into the growth tube 230. This results in a less turbulent gas flow and more efficient pre-mixing of the gases before injection into the growth tube 230. The reduced turbulence provides a more stable and consistent environment for nanotube growth which promotes the synthesis of long carbon nanotubes 50. Other CVD chambers 200 that are configured to produce a low turbulence gas flow can also be used.

The CVD chamber 200 is then heated to about 850-1000° C. In one exemplary embodiment, the CVD growth procedure first involves heating of the substrate 10 and metal underlayer 20 to 900° C. in argon for thirty minutes. The application of heat causes the metal underlayer 20 to be broken down into droplets and the nanoparticle catalyst is activated to form nanoparticles when a hydrocarbon source is later added. Then, hydrogen ($H_2$) was flowed over the sample for 10 minutes. Other heating treatments and/or gas flow treatments known within the art are within the scope of this disclosure.

Next, a hydrocarbon source is introduced into the CVD chamber 200. The hydrocarbon source can be any hydrocarbon or carbon-containing compound known in the art such as methane ($CH_4$), carbon monoxide (CO), and the like. In a preferred embodiment, the hydrocarbon source comprises a mixture of methane and hydrogen. For example, methane with a flow rate of 1000 standard cubic centimeters per minute (sccm) can be mixed with hydrogen with a flow rate of 200 sccm. The hydrocarbon mixture is flowed over the sample for 15 minutes. The hydrocarbon mixture activates growth of the nanotube 50. The wells or trenches 35 created by the photoresist 30 and lift-off process create islands of nanotube 50 growth. Nanotube 50 growth can be controlled by selecting the heating temperature, hydrocarbon mixture and growth time and the disclosure above represents only one exemplary method. For example, if longer nanotubes 50 are desired, the growth time can be extended. The sample is then allowed to cool slowly in argon.

Figure 3:
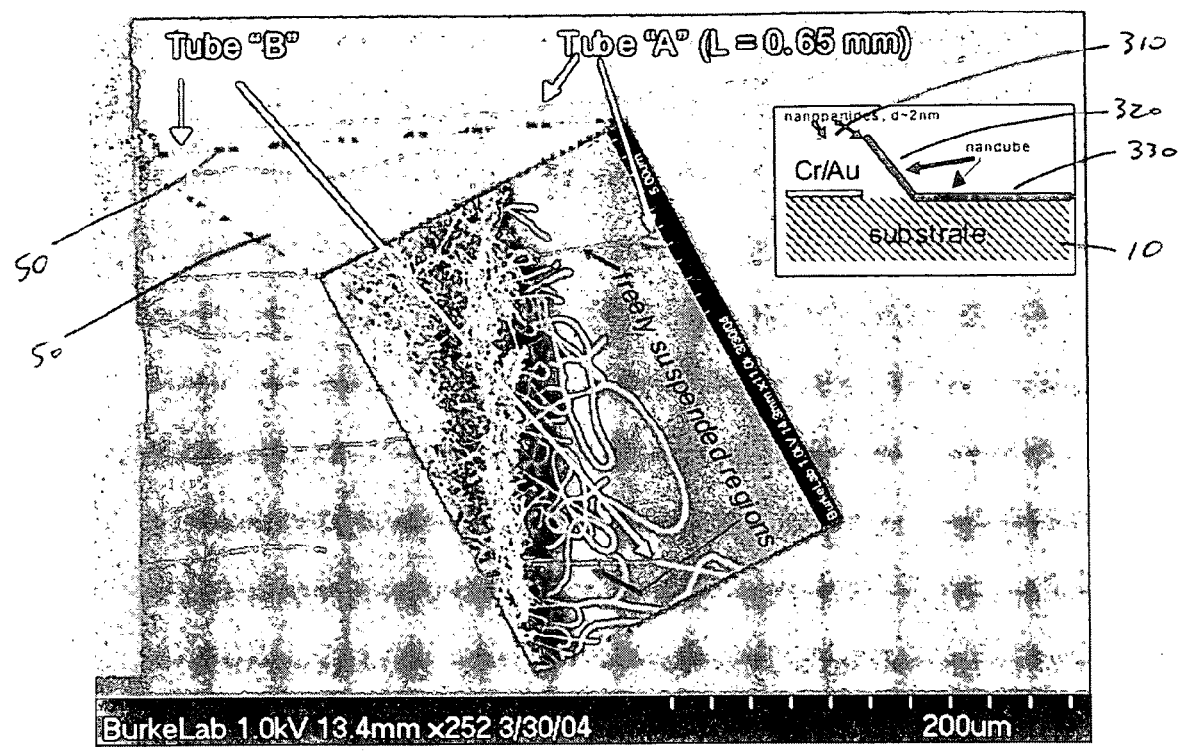
FIG. 3 is an SEM image and schematic showing that a nanotube is freely suspended at the beginning of growth using the carbon nanotube synthesis methods disclosed herein.
Figure 4:
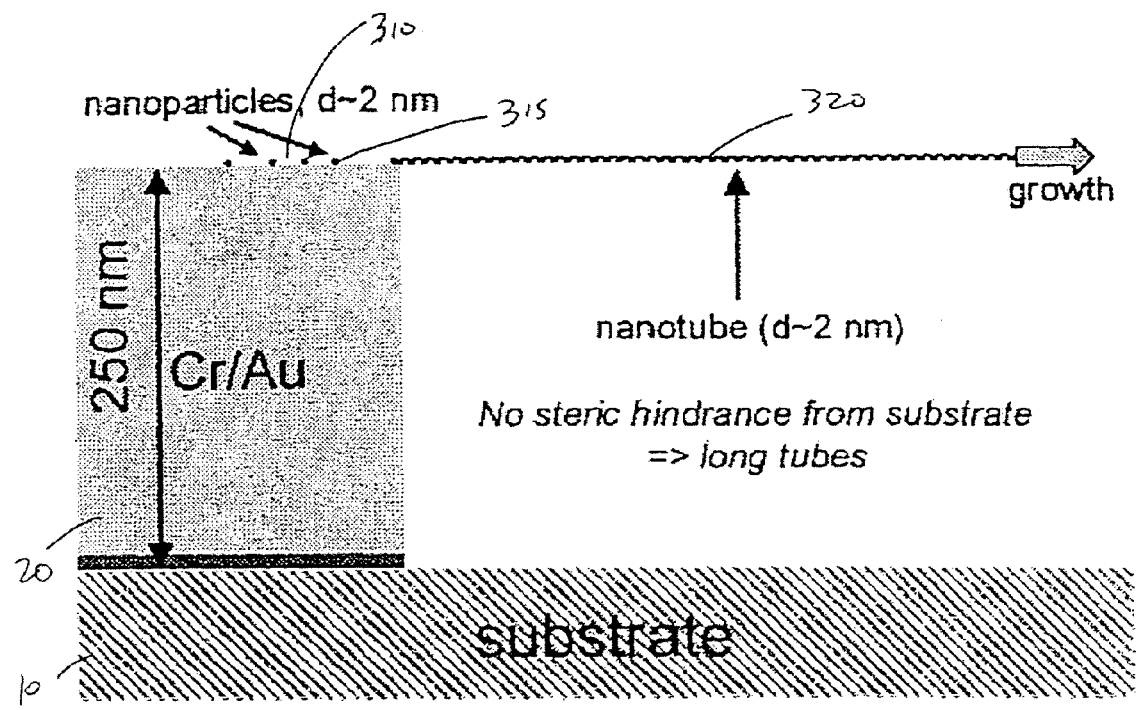
FIG. 4 is a schematic drawing of nanotube growth from an elevated catalyst site.

During nanotube 50 synthesis and growth, the metal underlayer 20 provides an elevated support platform for the nanoparticle catalysts 40. The metal underlayer 20 effectively creates a barrier between the nanoparticle catalysts 40 and the substrate 10 that allows the nanotube 50 to grow without interference from the substrate 10. As discussed further below, without the metal underlayer 20, steric hindrance from the substrate 10 can inhibit growth of the nanotubes 50 (FIGS. 3 and 4). Thus, substrates 10 without an elevated platform from an attached metal underlayer 20 exhibit shorter nanotube 50 lengths. With the metal underlayer 20 acting as a platform, the nanotubes 50 are able to grow without impedance from the substrate 10. Preferably, the height of the metal underlayer 20 platform is at least about 50 times larger than the diameter of the nanotube catalyst particles 315 and the nanotube 50. In an exemplary embodiment, the metal underlayer 20 is approximately 250 nm in comparison to the diameter of the nanotube catalyst particles and nanotube which is approximately 2 nm (FIG. 4).

Figure 5:
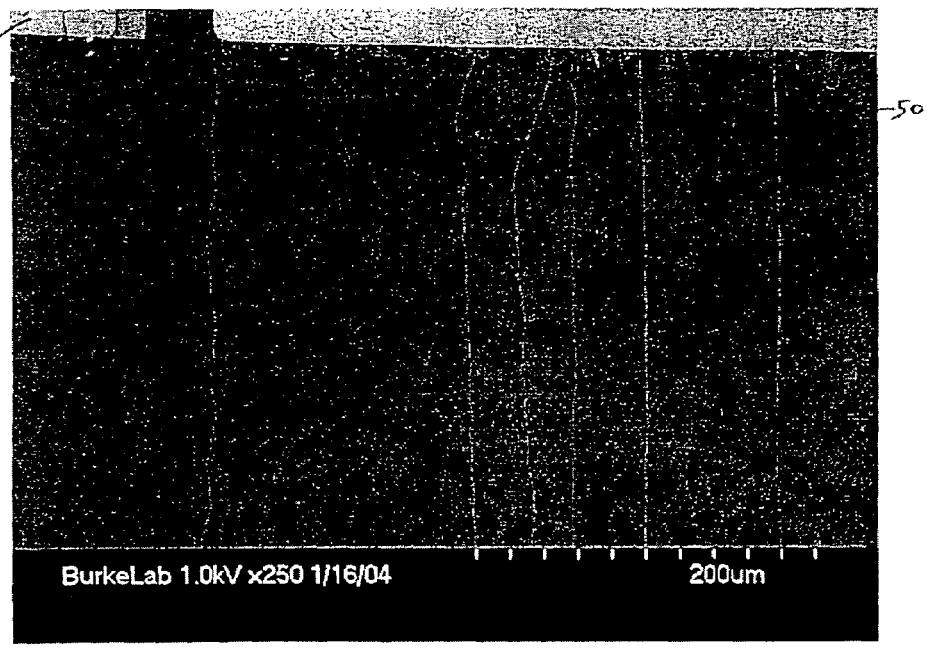
FIG. 5 is an SEM image showing an array of nanotubes grown using the carbon nanotube synthesis methods disclosed herein.
Figure 6:
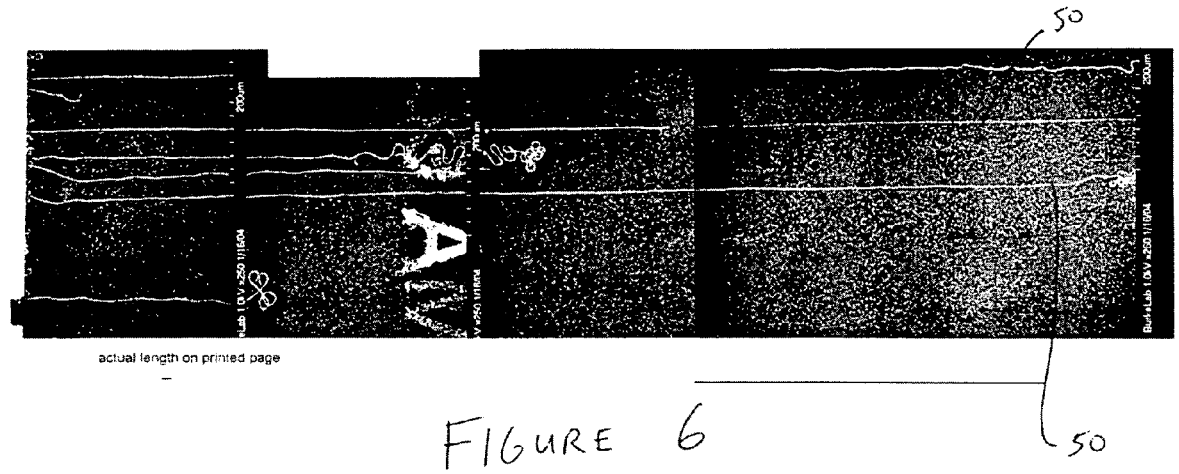
FIG. 6 is a mosaic of SEM images showing an array of 1.5 mm long SWNTs grown using the carbon nanotube synthesis methods disclosed herein.
Figure 7:
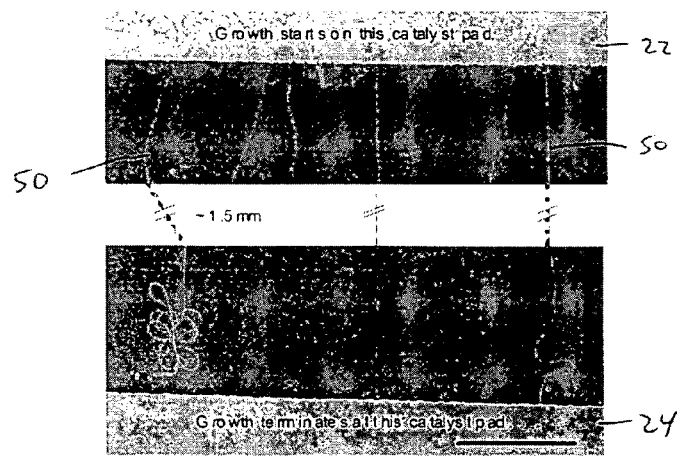
FIG. 7 is a high magnification SEM image of initial and terminal points of the long nanotubes shown in FIG. 6.

As shown in FIGS. 3 and 4, during nanotube 50 growth, the nanotube 50 has three main synthesis regions. The first region 310 comprises the nanotube catalyst particles 315. The nanotube catalyst particles 315 lie above the metal underlayer 20 and typically not yet formed into a nanotube 50. The next region 320 comprises a formed nanotube that is freely suspended from the substrate 10 in the low turbulence gas flow. In this region, the nanotube 50 is typically not in contact with either the metal underlayer 20 or the substrate 10 and is in a growth phase. As shown in FIG. 4, this freely suspended state reduces the steric forces that can hinder nanotube 50 growth. Finally, the third region 330 comprises a nanotube 50 that lies directly above the substrate 10. In this region, the nanotube 50 is not growing and gently settles to the substrate 10 to be van der Waals-bound to the substrate 10. In a preferred embodiment, nanotube 50 growth is promoted until the nanotube 50 extends the full span of the trench 35. In this embodiment, the nanotube 50 is connected at both ends to the conductive metal that comprises the metal underlayer 20 (FIGS. 5-7). The arrays of nanotubes are aligned in a direction parallel to the gas flow and many will extend to the opposite catalyst pad in a somewhat linear manner as shown in FIG. 7. The metal underlayer tends to melt during the CVD growth process and flows over the nanotube just after growth during the CVD run. The nanotube 50 is therefore electronically contacted and a post-growth processing step is not required to create an aligned nanotube electrode 60 with electrical contacts.

Due to the extremely small diameter of single-walled carbon nanotubes (generally about 1.4 to 1.9 nm), it is typically very difficult to align electrodes on SWNTs without expensive instruments such as an electron beam writer. In addition, the process of aligning electrodes is very time consuming and can cause damage to and/or destroy the nanotube 50. In a preferred embodiment, the metal underlayer 20 comprises gold (Au). Using the method described herein, ultralong nanotubes 50 are synthesized and extend between two gold metal underlayer regions 22, 24 (FIG. 7). Since the nanotube 50 is thereby connected to a gold layer on both ends at the end of the growth process, no additional post-contact connection step is required. This reduces the time and cost of creating nanotube electrodes 60.

Figure 12:
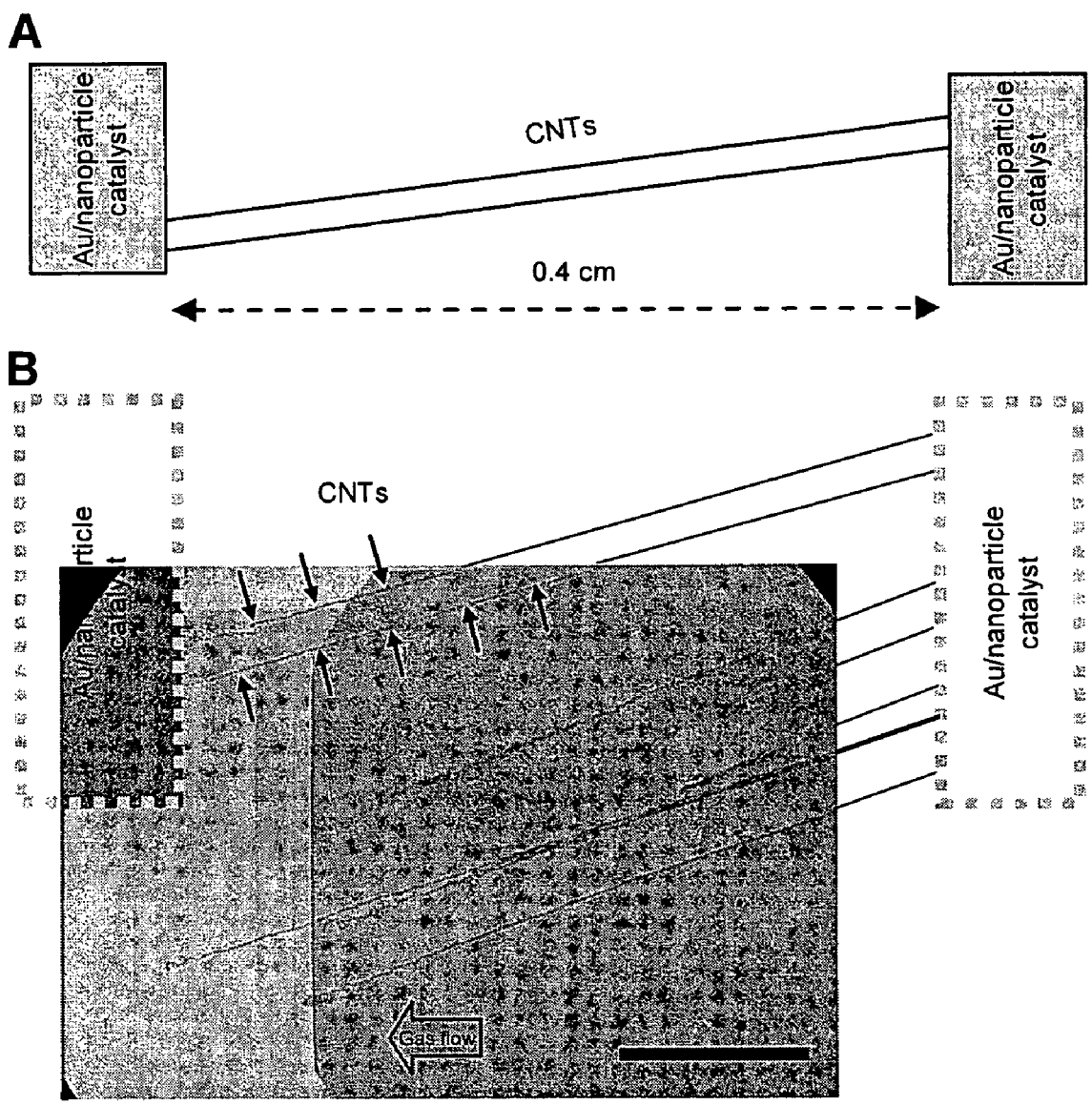
FIG. 12 includes a schematic (A) and a SEM image (B) showing two nanotubes bridging the gap.

Referring to FIG. 12, two nanotubes formed by the process disclosed above are shown schematically (FIG. 12A) and in a SEM image to bridge the gap between catalyst pads. The depletion curve for this sample showed two turn-on voltages, indicating that each nanotube was electrically contacted, was semiconducting and had a separate threshold voltage. Thus, the nanotubes were formed as electrical conductors without any post growth processing to form electrical contacts.

For very short carbon nanotubes which are in the ballistic limit, the contact resistance dominates. For long carbon nanotube formed using the process described above, the contact resistance is negligible and the on state resistance is dominantly due to the channel resistance. The nanotube formed using the process described above exhibit a resistance per unit length of about 6-7 kOhm/μm, a 1 d conductivitiy of $1.4 \times 10^{-8}$ Ohm-cm, and a mean free path (=conductivity/$2G_0$, with $G_0$ the conductance quantum) of 1 μm, comparable to the best measured nanotube conductivities for both metallic and semiconducting carbon nanotubes to date.

In a further embodiment, a conductive material layer can be added onto the surface of the substrate 10 after the growth process to form a nanotube electrode 60. The conductive material is preferably a metal such as gold, aluminum, silver, copper, platinum, or the like. The conductive material is deposited onto the substrate 10 by any method known in the art such as electron beam evaporation, ion sputtering, or thermal evaporation. The conductive layer forms one or more electrodes in connection with the nanotube 50. The method allows for the aligning of nanotube electrodes 60 using only standard photolithography in contrast to previous methods that required the use of expensive instruments such as electron beam writers. Because the nanotubes are grown between the metal underlayers 20, the metal underlayers 20 can be used to align the electrodes in a fast and cost-efficient manner.

Nanotubes 50 grown using the methods described herein exhibited three general mechanisms for terminating growth of the nanotube (FIG. 6). First, the nanotube will continue to grow straight until it hits the nearest obstacle. In FIG. 6, this mechanism is demonstrated by the two nanotubes which extend from one side to the other. The growth of these nanotubes only ceased when they contacted an obstacle, which in this case was another catalyst site. The second mechanism for terminating growth occurs when the nanotube grows straight over distances on the order of millimeters and then begins to turn with a radius of curvature on the order of 10 µm and terminates at the nearest obstacle. Finally, the third method occurs when the nanotube grows straight over distances on the order of millimeters and then turns extensively, returning on itself many times, without reaching the nearest obstacle. Each of these three termination mechanisms involves the termination of growth once the nanotube encounters an obstacle. Therefore, use of the methods described herein with catalyst sites disposed sufficiently apart could yield nanotubes that span the distance between the catalyst sites.

Figure 9:
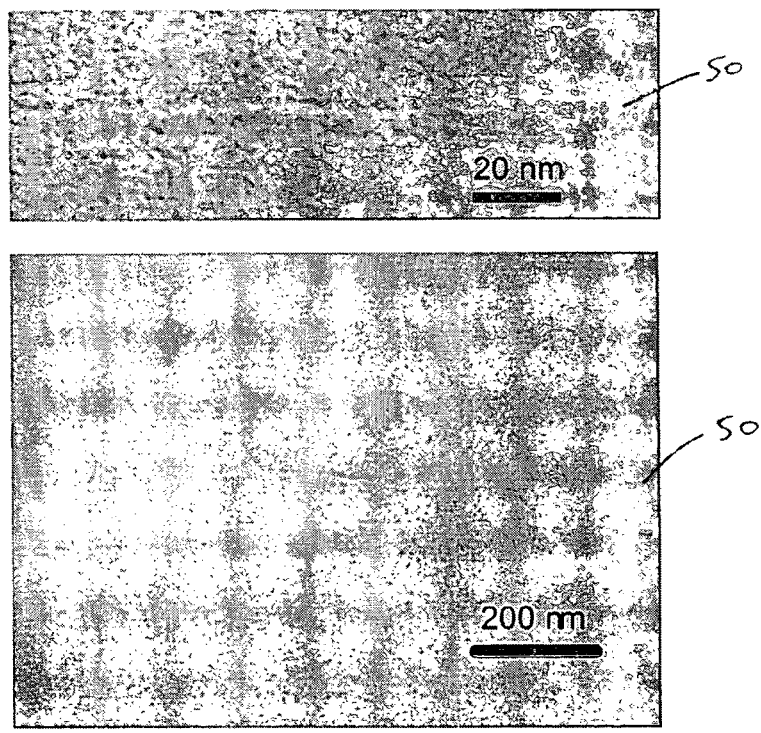
FIG. 9 are TEM images of a 150 μm long SWNT grown on a thin silicon nitride ($Si_3N_4$) membrane.
Figure 8:
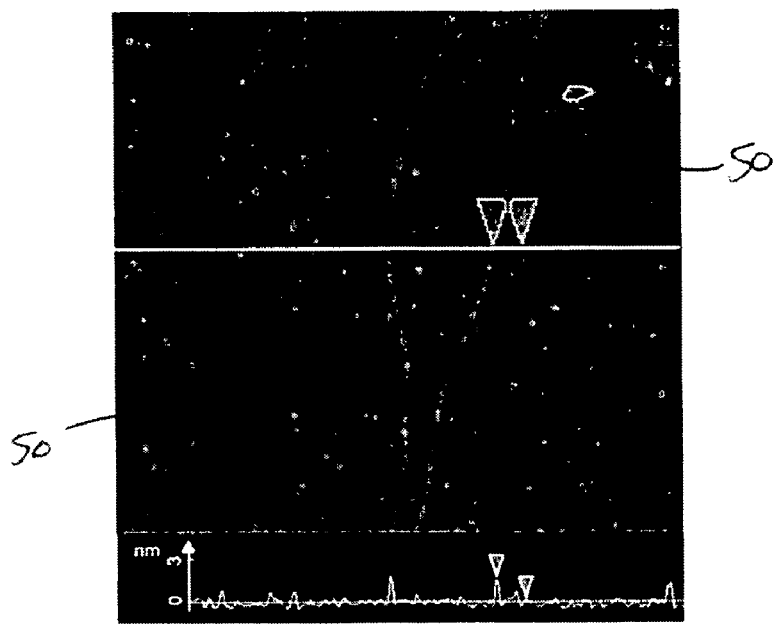
FIG. 8 is an AFM image of nanotubes grown using the carbon nanotube synthesis methods disclosed herein.

An AFM (Digital Instruments, Multi-mode) image of the nanotubes synthesized using the present method shows that the nanotubes 50 generated have a height or diameter typically in the range of 1.4 to 1.9 nm (FIG. 8). Two of the nanotubes depicted in FIG. 8 have heights of 1.6 and 1.7 nm. TEM imaging of the nanotubes indicates that the nanotubes are individual single-walled nanotubes and not bundles (FIG. 9). Other TEM images have indicated that shorter nanotubes synthesize using the present methods are single-walled but occasionally have bundles.

Figure 10:
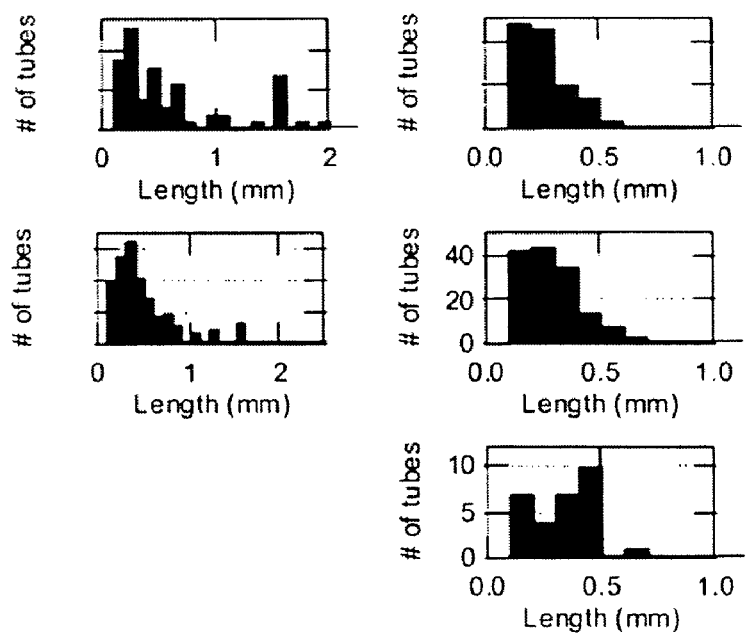
FIG. 10 are histograms of nanotube lengths from five separate growth runs grown using the carbon nanotube synthesis methods disclosed herein.

The length and number of nanotubes created from five different growth runs are plotted in FIG. 10. The five growth runs corresponded to three separate catalyst depositions. For each of the five growth runs, the length of all the nanotubes 50 grown from one-third of the 18 catalyst pads on the chip were measured. Each pad used was 1×2 mm in size. As can be seen in the histograms, each of the growth runs produced nanotubes longer than 0.5 mm. Two of the test runs produced several nanotubes greater than 1 mm in length. As stated above, using the methods described herein, ultralong nanotubes as long as 1 cm have been produced.

Figure 11:
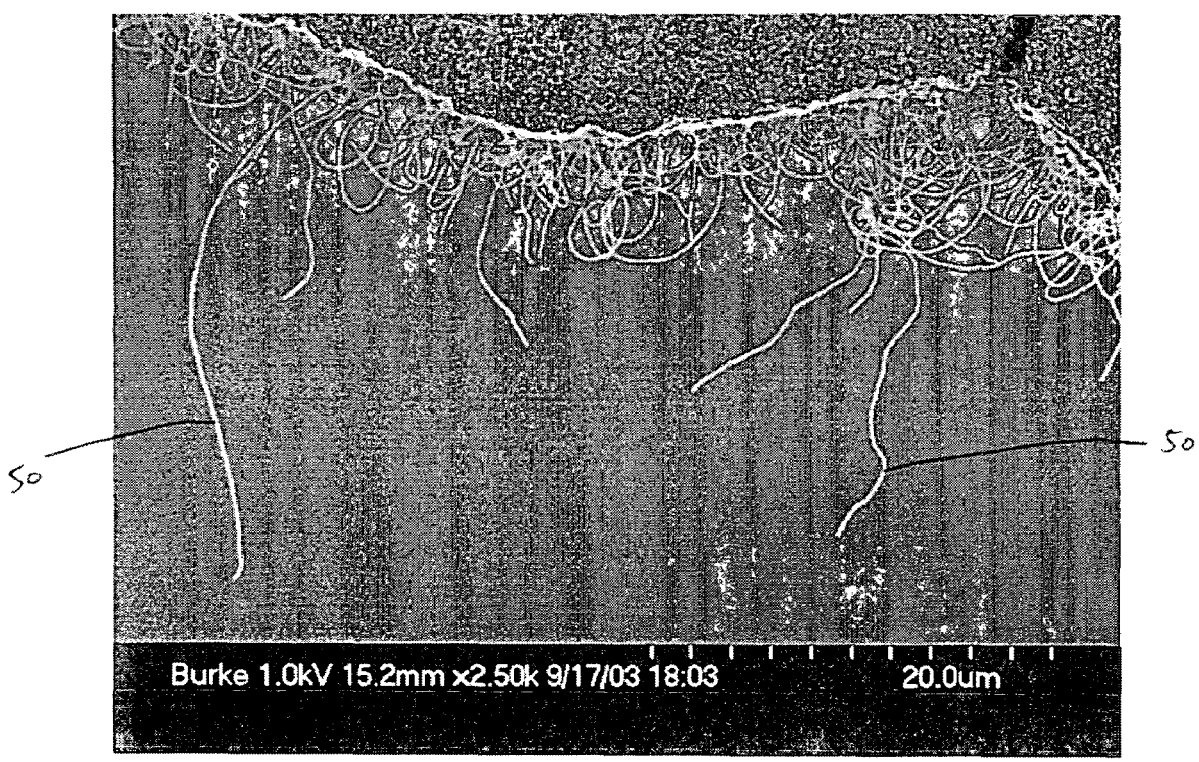
FIG. 11 is a SEM image of nanotubes grown without a metal underlayer.

For the growth of single-walled nanotubes, experimental results indicate that the concentration of nanoparticle catalysts influence the growth rate of the nanotube. In a separate experiment, a substrate was initially prepared as described above. The substrate comprised a silicon wafer with a layer of silicon dioxide. In contrast to the method disclosed above, a metal underlayer platform was not deposited onto the substrate. Different concentrations of a nanoparticle catalyst solution were utilized to determine the optimal concentration for growth. Five different dilution concentrations were tested: original, 5×, 10×, 20×, and 50× dilutions. Save the 50× dilution, each of the remaining concentrations was tested in at least two growth runs. Experiments demonstrated that the 10× dilution produced the optimal growth for long nanotubes. However, without the use of a metal underlayer 20 as described herein, nanotubes 50 even in the 10× dilution did not exceed 100 µm. FIG. 11 shows a typical SEM image of nanotubes 50 grown without a metal underlayer 20. At the two lowest concentrations tested, 25× and 50×, the growth yield was low. In contrast, at the two highest concentrations tested, original and 5×, nanotube growth yield was high. However, in these conditions, the length of the nanotubes were shorter than the 10× dilution because the nanotubes tended to overlap and entangle with each other.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method of synthesizing a carbon nanotube electrode comprising the steps of:
   heating a substrate having first and second catalyst pads positioned in space relation, the catalyst pads including a metal underlayer providing a platform; and
   feeding a hydrocarbon gas over the substrate,
   growing a carbon nanotube freely suspended in spaced relation with the substrate and bridging the gap between the first and second catalyst pads, and
   forming electrical contacts from the metal underlayer platforms without a post nanotube growth electric contact formation process step, wherein the electrical contacts are coupled to the ends of the nanotube.

2. The method of claim 1 wherein the step of forming electrical contacts includes melting the metal underlayer during the step of growing the nanotube.

3. The method of claim 1 further comprising the step of conducting current across the carbon nanotube.

4. The method of claim 3 wherein the carbon nanotube is about 1 cm long.

5. The method of claim 1 further comprising the step of depositing a nanoparticle catalyst comprising nanoparticles onto the metal underlayer, wherein the height of the catalyst pads are at least fifty times greater than the diameter of the nanoparticles.

6. The method of claim 1 wherein the feeding a hydrocarbon gas over the substrate includes injecting the gas in a low turbulence flow.

7. The method of claim 1 wherein the nanotube grows freely from the catalyst pad and suspended in spaced relation with the substrate.

8. The method of claim 1, wherein the metal underlayer comprises gold.

9. The method of claim 1, wherein the metal underlayer comprises a conductive metal.

10. The method of claim 1, wherein the metal underlayer comprises gold and chromium.

11. The method of claim 6, wherein a reaction chamber in which the carbon nanotube is grown comprises a low flow turbulence gas-flow injector configured to produce a reduced turbulence gas flow.

12. The method of claim 1, wherein the hydrocarbon gas comprises methane.

13. The method of claim 1, wherein the hydrocarbon gas comprises a mixture of methane and hydrogen.

14. A method of synthesizing a carbon nanotube comprising:
   flowing a hydrocarbon gas over a substrate and a catalyst in a reaction chamber, wherein the catalyst is deposited on first and second metal underlayer platforms;

growing a nanotube, wherein growth is initiated in spaced relation to the substrate and the nanotube continues to grow freely suspended above the substrate, and forming first and second electrical contacts from the first and second metal platforms while growing the nanotube, wherein the first and second electrical contacts are connected to first and second ends of the nanotube and couplable to a current source to conduct electric current through the nanotube.

15. The method of claim 14 wherein the step of forming electrical contacts includes melting the first and second metal underlayer platforms in spaced relation during the step of growing the nanotube.

16. The method of claim 14 wherein the carbon nanotube is about 1 cm long.

17. The method of claim 14 wherein the step of flowing a hydrocarbon gas over the substrate includes injecting the gas in a low turbulence flow.

18. The method of claim 14, wherein the first and second metal underlayers comprise gold.

19. The method of claim 14, wherein the first and second metal underlayers comprise a conductive metal.

20. The method of claim 14, wherein the first and second metal underlayers comprise gold and chromium.

21. A method of forming a carbon nanotube and using the nanotube as an electrical conductor, comprising the steps of:
flowing a hydrocarbon gas over a substrate and a catalyst, and forming a carbon nanotube with electrical contacts coupled to each end of the nanotube, without undergoing a post-nanotube-growth electrical contact formation process, wherein the electrical contacts are couplable to a current source to conduct a current through the nanotube.

22. The method of claim 21 wherein the nanotube is about 1 cm long.

* * * * *

UNITED STATES PATENT AND TRADEMARK OFFICE
CERTIFICATE OF CORRECTION

PATENT NO. : 7,645,482 B2
APPLICATION NO. : 11/224917
DATED : January 12, 2010
INVENTOR(S) : Burke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this

Sixteenth Day of November, 2010

David J. Kappos
*Director of the United States Patent and Trademark Office*